(12) United States Patent
Buffam

(10) Patent No.: US 7,505,467 B1
(45) Date of Patent: Mar. 17, 2009

(54) METHOD AND APPARATUS FOR DYNAMIC BANDWIDTH MANAGEMENT FOR VOICE TRAFFIC IN A DIGITAL COMMUNICATIONS NETWORK

(75) Inventor: Bruce Buffam, Woodlawn (CA)

(73) Assignee: Cisco Technology, Inc., San Jose, CA (US)

( * ) Notice: Subject to any disclaimer, the term of this patent is extended or adjusted under 35 U.S.C. 154(b) by 698 days.

(21) Appl. No.: 09/823,808

(22) Filed: Mar. 30, 2001

(51) Int. Cl.
*H04L 12/28* (2006.01)

(52) U.S. Cl. .............................. 370/395.2; 370/395.64; 370/537

(58) Field of Classification Search ................. 370/217, 370/225, 229–230, 231–7, 252, 351–3, 389, 370/391–2, 395.1–395.4, 411, 397, 399, 370/431, 433–435, 437, 458, 477, 535–537 370/395.6, 395.64, 395.63, 395.61
See application file for complete search history.

(56) References Cited

U.S. PATENT DOCUMENTS

| | | | |
|---|---|---|---|
| 5,953,339 A | | 9/1999 | Baldwin et al. |
| 6,182,193 B1 | * | 1/2001 | Hamami ................... 370/395.2 |
| 6,185,210 B1 | * | 2/2001 | Troxel ...................... 370/395.32 |
| 6,243,382 B1 | * | 6/2001 | O'Neill et al. .......... 370/395.52 |
| 6,252,877 B1 | * | 6/2001 | Kozaki et al. .............. 370/399 |
| 6,366,580 B1 | * | 4/2002 | Bradley et al. ............. 370/395.2 |
| 6,449,276 B1 | | 9/2002 | Subbiah et al. |
| 6,496,508 B1 | | 12/2002 | Breuckheimer et al. |
| 6,519,261 B1 | | 2/2003 | Breuckheimer et al. |
| 6,538,991 B1 | * | 3/2003 | Kodialam et al. ........... 370/229 |
| 6,618,383 B1 | * | 9/2003 | Tomlins .................. 370/395.5 |
| 6,665,273 B1 | * | 12/2003 | Goguen et al. .............. 370/252 |
| 6,683,877 B1 | | 1/2004 | Gibbs et al. |
| 6,760,335 B1 | * | 7/2004 | Andersson et al. ........ 370/395.2 |
| 6,891,833 B1 | * | 5/2005 | Caves et al. .............. 370/395.2 |

OTHER PUBLICATIONS

Awduche, MPLS and Traffic Engineering in IP Networks, 1999, IEEE, pp. 42-47.*
"ATM Trucking using AAL2 for Narrowband Services", The ATM Forum Technical Committee, AF-VTOA-0113.000 Final Ballot, Jan. 1999, p. 1-52.
Bellcore, G. Ratta, Chief Editor, ATM User-Network Interface, Version 3.1 (UNI 3.1) Specification, The ATM Forum, Draft of May 28, 1994, p. I-68.
"Broadband Integrated Services Digital Network (B-ISDN)—Digital Subscriber Signaling System No. 2 (DSS 2)—User-Network Interface (UNI) Layer 3 Specification For Basic call/Connection Control", ITU-T Telecommunication standardization Sector of ITU, B-ISDN Application Protocols For Access Signaling, ITU-T Recommendation Q.2931 (Feb. 1995), p. 1-249.

(Continued)

*Primary Examiner*—Doris H. To
*Assistant Examiner*—Ian N. Moore
(74) *Attorney, Agent, or Firm*—Blakely, Sokoloff, Taylor & Zafman LLP

(57) ABSTRACT

A method and apparatus for dynamic bandwidth management for voice traffic in a digital communications network is disclosed. In one embodiment, a method for use in a digital communications network comprises checking a multiplexed connection's bandwidth capacity to carry a call over a link; and overflowing the call onto a non-multiplexed connection, when the multiplexing connection's bandwidth is insufficient to carry the call.

16 Claims, 4 Drawing Sheets

OTHER PUBLICATIONS

ITU-T I.366.2, (Nov. 2000), ITU-T I.366.2, Corrigendum 1 (Mar. 2002), Series I: Integrated Services Digital Network, Overall network aspects and functions—Protocol layer requirements, AAL type 2 service specific convergence sublayer for narrow-band services.

ITU-T Q.2630.1, (Dec. 1999)—Series Q: Switching and Signalling, Broadband ISDN—Common aspects of B-ISDN application protocols for access signaling and network signaling and interworking—AAL type 2 signalling protocol—Capability set 1.

ITU-T Q.2630.2, (Dec. 2000)—Series Q: Switching and Signalling, Broadband ISDN—Common aspects of B-ISDN application protocols for access signaling and network signaling and interworking—AAL type 2 signalling protocol—Capability set 2.

Ericsson Review, No. 2, p. 53 (1999).

Motorola General Business Information, "Chapter 1: AAL-2 Switch Application Guide," CSTAA1-UG/D Rev 01, p. 12 (dated before Mar. 30, 2001).

"*Technical* Specification," 3GPP, TS S3.14 V0.021, 1 page (1999).

Daniel O. Awduche, "MPLS and Traffic Engineering in IP Networks," IEEE Communications Magazine, pp. 42-47 (Dec. 1999).

* cited by examiner

METHOD AND APPARATUS FOR DYNAMIC BANDWIDTH MANAGEMENT FOR VOICE TRAFFIC IN A DIGITAL COMMUNICATIONS NETWORK

FIELD OF THE INVENTION

The present invention relates to managing data sent through a digital network and, more specifically, to a method and apparatus for dynamic bandwidth management.

BACKGROUND OF THE INVENTION

Asynchronous Transfer Mode (ATM) or "cell switching" is a method of transmitting digital information wherein the information is broken into equal size units named "cells". Each cell is 53 octets in length that consists of 5 octets of cell header information and 48 octets of payload. Using the portion of the cell header known as the virtual path index (VPI) and the Virtual Connection Index (VCI) multiple streams of user data can be carried over a single ATM physical media. Most ATM switches support a wide range of media types for digital transmission such as T1, E1, DS-3, E-3, OC-3, OC-12, etc. Regardless of media type, each media interface within a given ATM switch is identified uniquely and thus each user stream entering or leaving the switch can be identified uniquely using the following naming convention, <interface_index.virtual_path_index.virtual_channel_index>. Each unique user stream within a given media interface is known as a connection segment. A complete ATM connection is the concatenation of one or more ATM connection segments. The act of concatenating the connection segments is the primary function of an ATM switch. There are two forms of concatenation, a unicast cross-connection and a multicast cross-connection. A unicast cross connection is described using the following naming pair, <<upstream:interface_index.virtual_path_index.virtual_channel_index>,<downstream:interface_index.virtual_path_index.virtual_channel_index>>. A multicast cross-connect differs slightly from the above example in that there can be more than one downstream connection segment.

Voice transport over any network technology poses a unique set of problems or requirements for the underlying networking technology. Voice is extremely intolerant of delay variation. Excessive "jitter" in the form of queuing delays or payload disordering render it difficult to accurately recreate the voice conversation at the receiving end. Excessive total delay caused by cumulative switching delays and large sampling intervals can lead to excessive total delay resulting in excessive echo. Loss of voice payloads is tolerated providing the loss detection techniques do not introduce increased "jitter". Similar to ATM, an ideal solution would divide voice and data into uniform chunks for carriage across the core of the network and introduce queuing mechanisms to ensure constant rate delivery of the voice payloads. One issue with the use of ATM for the transport of voice is the size of the payload. Prior to the advent of ATM AAL2 the predominant techniques for voice transmission, namely AAL1 and AAL5 proved to be either wasteful of network bandwidth because most voice payloads are much smaller than 48 octets or wasteful of bandwidth because of excessive header and trailer overhead. These issues are particularly exacerbated over low speed ATM access such as DSL or T1/E1 transmission medium. For example, a T1 interface running TDM can accommodate 24 channels of uncompressed voice whereas 24 channels of uncompressed voice over ATM will not fit in a T1 cell interface.

These issues lead to the development of ATM Adaptation Layer 2(AAL2). In AAL2, another layer of stream identification known as the Channel Identifier (CID) was introduced and a format devised to allow the packing of multiple voice streams sharing a common destination into a single ATM connection. Using this technique a voice stream is uniquely identified using the following naming convention, <interface_index.virtual_path_index.virtual_channel_index.channel_id>. This opens the opportunity to provide a switching function for voice flows analogous to ATM cell switching such that a voice connection could consist of one or more concatenated voice cross-connects, described as follows, <<upstream: interface_index.virtual_path_index.virtual_channel_index.channel_id>,<downstream:interface_index.virtual_path_index.virtual_channel_index.channel_id>>. AAL2 provides for the setup of ATM AAL2 connections that are configured to support up to 255 voice channels carried within or can be restricted to just one voice channel carried within. AAL2 connections can be configured as permanent virtual circuits by the operator or they can also be set up on demand as switched virtual circuits using the ATM networking layer. Given that AAL2 implements a voice network on top of an ATM network infra-structure using an overlay technique, it is natural to expect that the configuration of multiplexed connections between any two voice switching nodes involves some network engineering analysis by the operator. Inevitably this analysis will raise questions regarding how much bandwidth to assign to the multiplexed connections, what action should be taken when bandwidth is exhausted on a multiplexed connection and how to promote efficient bandwidth utilization within these connections. An over-commitment of bandwidth can reduce network bandwidth efficiency and an under-commitment can deny service to users, particularly at peak times. Particularly, in cases where the underlying ATM network has plenty of unused capacity, service denial constitutes an error and perhaps a failure to honor the service level agreement (SLA) between the network operator and the customer.

SUMMARY OF THE INVENTION

A method and apparatus for dynamic bandwidth management for voice traffic in a digital communications network is disclosed. In one embodiment, a method for use in a digital communications network comprises checking a multiplexed connection's bandwidth capacity to carry a call over a link; and overflowing the call onto a non-multiplexed connection, when the multiplexing connection's bandwidth is insufficient to carry the call.

Other features and advantages of the present invention will be apparent from the accompanying drawings and from the detailed description that follows below.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

A method and apparatus for dynamic bandwidth management for voice traffic in a digital communications network is disclosed. As will be discussed in greater detail below, in one embodiment, a method for use in a digital communications network comprises checking a multiplexed connection's bandwidth capacity to carry a call over a link; and overflowing the call onto a non-multiplexed connection, when the multiplexing connection's bandwidth is insufficient to carry the call.

Typically, high-speed data switches are capable of handling many different classes of cell traffic, each class having different characteristics and different service requirements. The various classes of cell traffic might include high priority traffic, voice, high-speed deterministic traffic, bursty data, etc. For example, voice traffic is relatively delay sensitive and insensitive to occasional cell loss. In contrast, data traffic, such as file transfers, is relatively insensitive to delay but is data loss sensitive.

Figure 1:
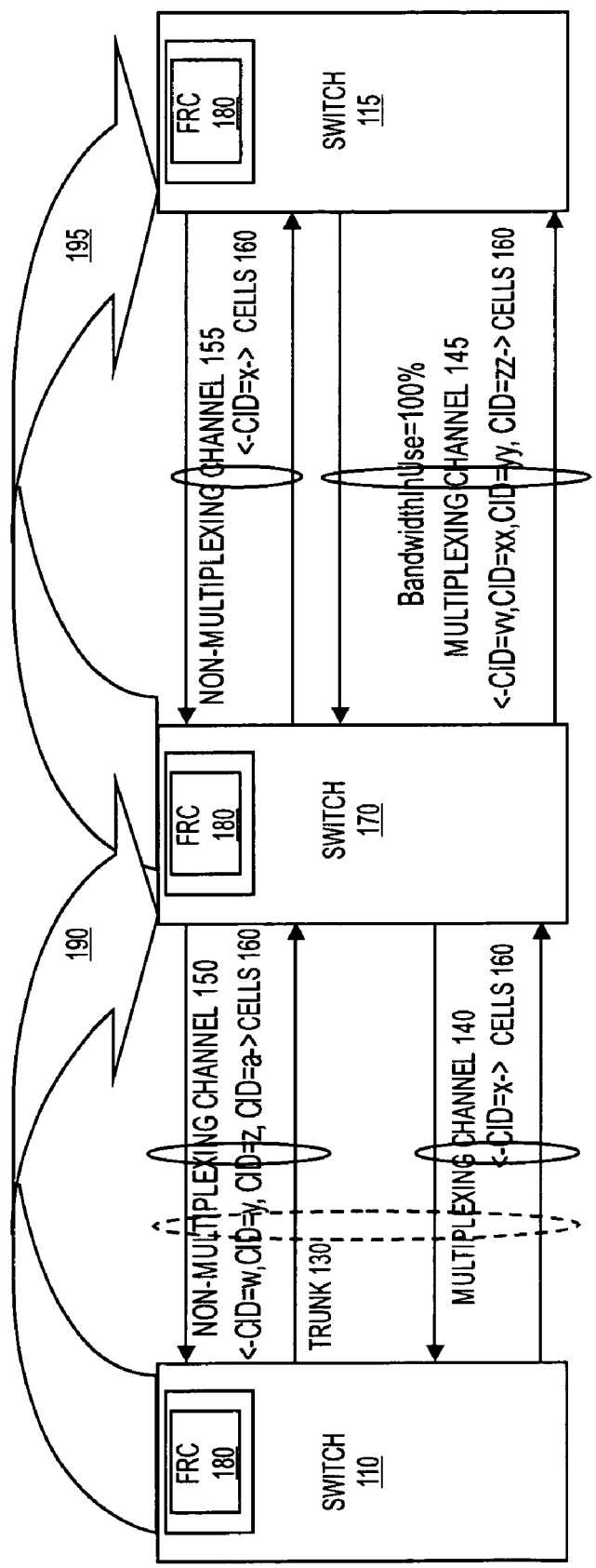
FIG. 1 illustrates an ATM network with dynamic bandwidth management for high priority traffic in a digital communications network.

FIG. 1 illustrates an ATM network with dynamic bandwidth management for high priority traffic in a digital communications network. Network 100 includes switch 110, switch 115, and switch 170. Switches 110, 115, and 170 may be high-speed switches such as those manufactured by Cisco Systems of San Jose, Calif. Included in switches 110, 115, and 170 are frame relay cards 180 having a voice-switching component for dynamically managing bandwidth in an ATM trunk.

A trunk 130 connects switches 110 and 170. Trunk 130 includes non-multiplexing channel 150 and multiplexing channel 140. Channels 140, 150 are both bi-directional. Each channel 140, 150 may carry thousands of connections or calls. Channel 140 may be a non-multiplexing AAL2 channel that carries time sensitive data, such as a voice or video call. Channel 150 may be a multiplexing AAL2 channel that carries digital data that is not time or frequency sensitive.

Non-multiplexing channel 155 and multiplexing channel 145 connect switches 170 and 115. Channels 155 and 145 have the same properties as channels 140 and 150, respectively, as described above. However, multiplexing channel 145 has all of its available bandwidth in use.

Figure 2:
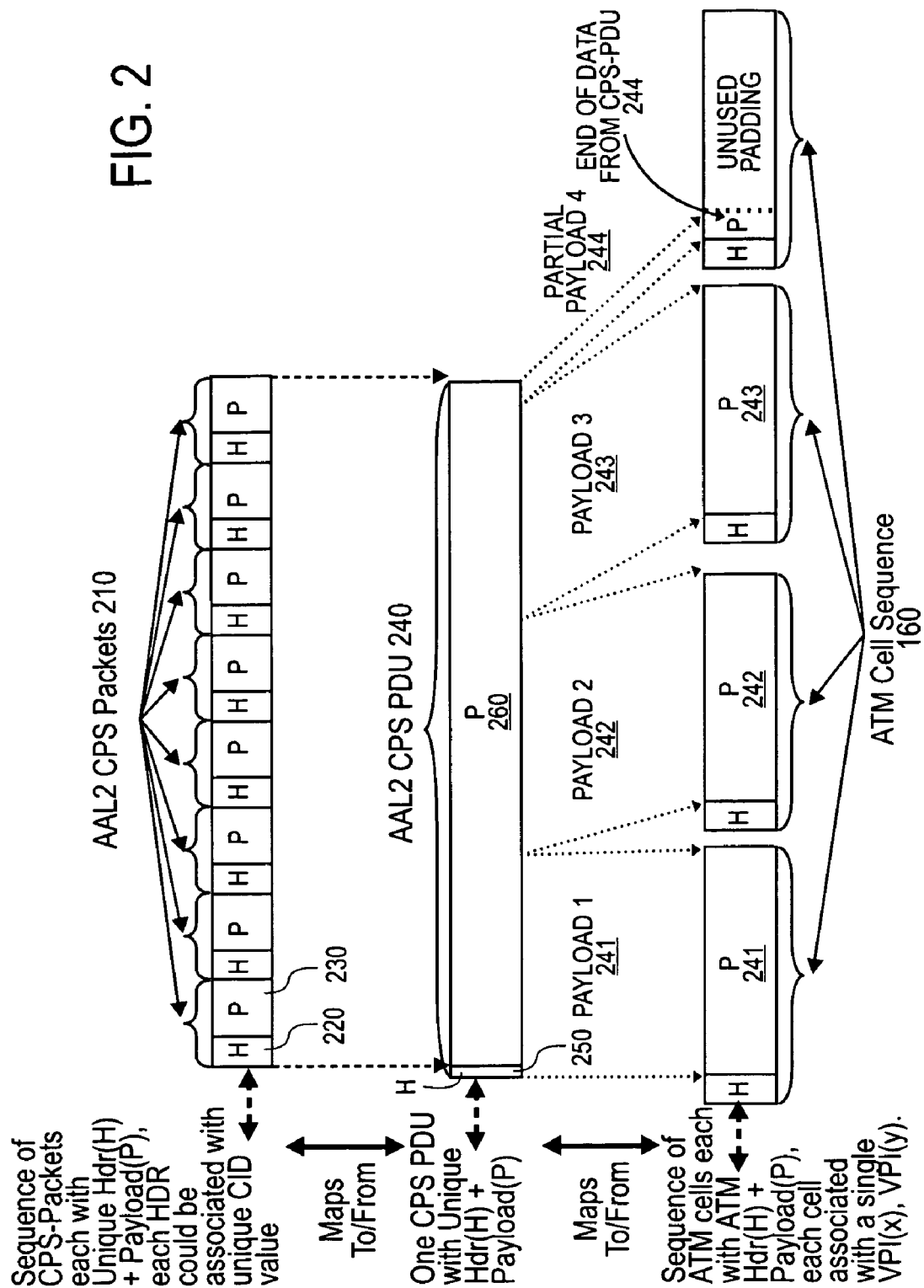
FIG. 2 illustrates exemplary Q.AAL2 data cells as implemented over the structure of ATM cell relay.

Cells 160 are multiplexed and carried over channels 150 and 145. Cells 160 may be Q.AAL2 cells. FIG. 2 illustrates exemplary Q.AAL2 data cells 160 as implemented over the structure of ATM cell relay. A Q.AAL2 cell 160 may be composed of AAL2 Convergence Packet Sub Layer (CPS) packets 210. Each CPS packet 210 has a three byte header 220 containing an 8 bit CID, a 5 bit header error correction field (HEC), a 6 bit length field and a 5 bit User to User Indication (UUI) field. CPS packets 210 have a maximum payload 230 of 45/64 octets of data.

The packets 210 that have a common CID are combined into a Protocol Data Unit (PDU) 240. PDU 240 contains a unique header 250 and payload 260. PDU 240 is broken into multiple payloads 241-244. Each payload 241-244 is stored within cells 160. Each cell is associated with a unique interface, virtual connection index (VCI) and virtual path index (VPI). Although only eight CPS packets 210 are shown, more or less may be handled.

Referring back to FIG. 1, multiple cells 160 are shown on channels 140, 145, 150, and 155. CID=x cell 160 on multiplexing channel 140 is a new call flowing into switch 170 from switch 110 as indicated by the arrow 190. Switch 170 attempts to route CID=x cell 160 to switch 115 (as shown by arrow 195), but finds that multiplexing channel 145 has no available bandwidth. Overflow occurs, and switch 170 adds a non-multiplexing connection 155 to carry CID=x cell 160.

Figure 3:
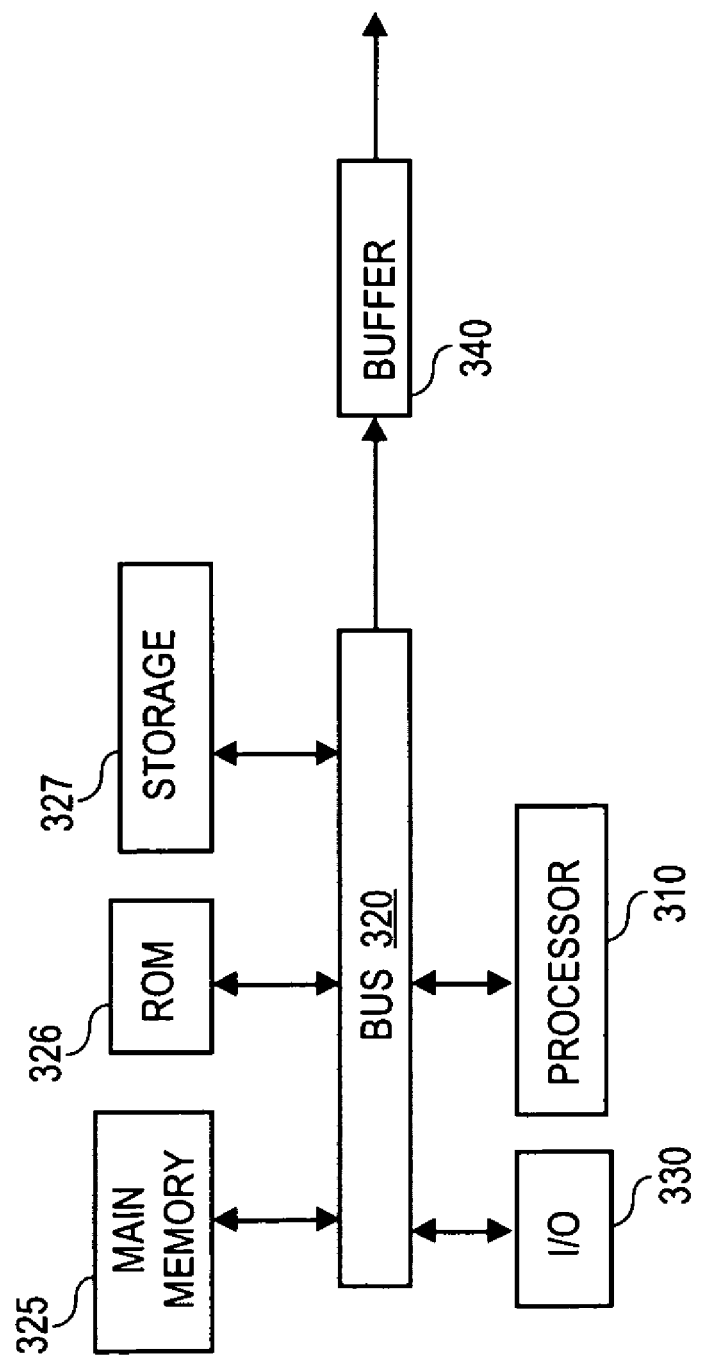
FIG. 3 illustrates the voice switching component of frame relay card.

FIG. 3 illustrates the voice-switching component 300 of frame relay card 180. One embodiment of voice-switching component 300 comprises a system bus 320 for communicating information, and a processor 310 coupled to bus 320 for receiving messages from line cards 180 and terminating commands carried in the messages. Voice-switching component 300 further comprises a random access memory (RAM) or other dynamic storage device 325 (referred to herein as main memory), coupled to bus 320 for storing information and instructions to be executed by processor 310. Main memory 325 also may be used for storing temporary variables or other intermediate information during execution of instructions by processor 310. Voice-switching component 300 also may include a read only memory (ROM) and/or other static storage device 326 coupled to bus 320 for storing static information and instructions used by processor 310.

A data storage device 327 such as a magnetic disk or optical disc and its corresponding drive may also be coupled to voice-switching component 300 for storing information and instructions. Switching component 300 includes buffer 340 for storing CPS packets 210 until cell 160 is filled to capacity and transmitted across channel 150. The buffer 340 may also transmit a cell at set time periods. Buffer 340 is also connected to bus 320.

Although embodiments of the present invention are described as having both software and hardware elements, alternative embodiments may be all hardware, all software, or a combination of each. The software implementing the present invention can be stored in RAM 325, a mass storage device available through disk interface, or other storage medium accessible to CPU 310. This software may also be resident on an article of manufacture comprising a computer usable mass storage medium or propagated digital signal having computer readable program code embodied therein and being readable by the mass storage medium and for causing CPU 310 to control tasks on networking cards in accordance with the teachings herein.

Figure 4:
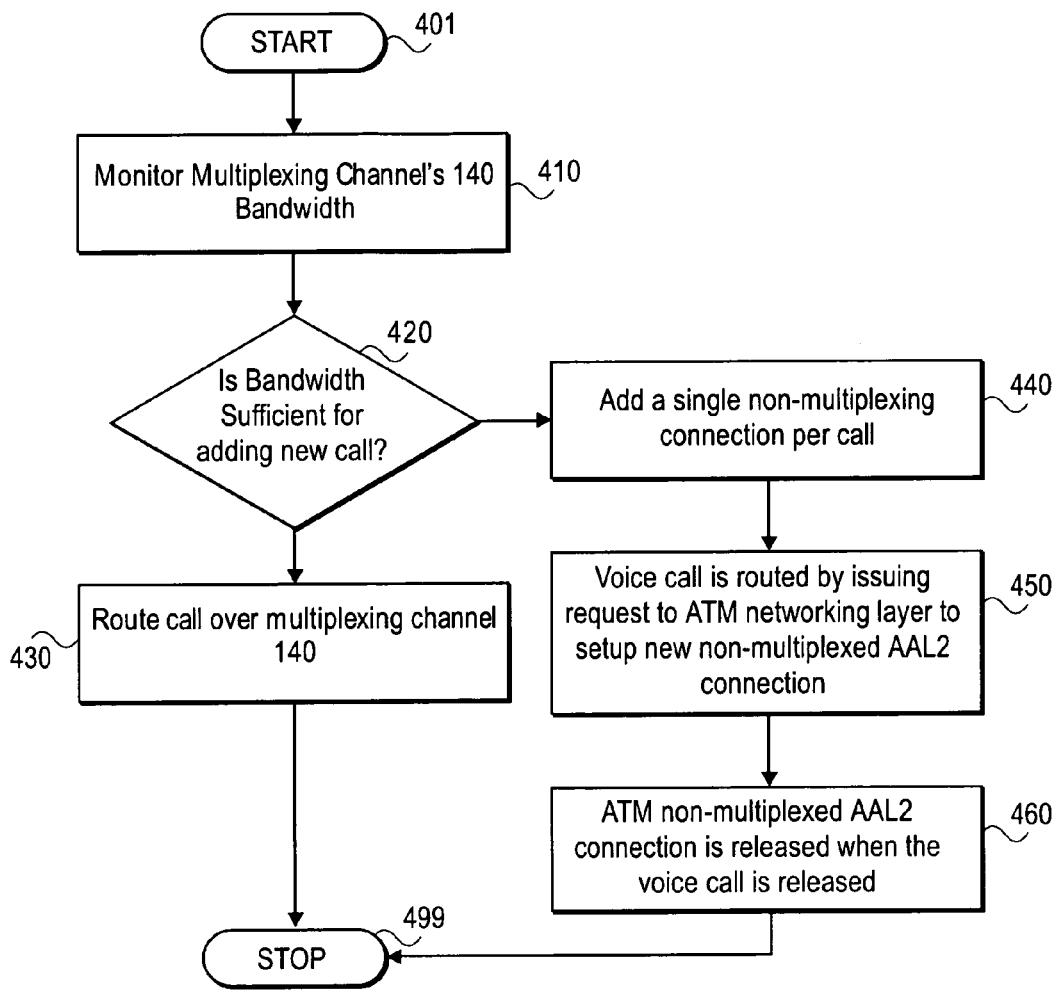
FIG. 4 illustrates an exemplary flow diagram of the process performed by switching component.

FIG. 4 illustrates an exemplary flow diagram of the process 400 performed by switching component 300. The process starts at block 401. Flow continues to processing block 410, where switching component 300 monitors the bandwidth usage on multiplexing channel 140. At decision block 420, Switching component 300 determines if there is sufficient bandwidth available on channel 140 to add a new call. If there is sufficient bandwidth available, flow continues to processing block 430. At processing block 430, the new call is routed over multiplexing channel 140 and the process completes at block 499.

If there is insufficient bandwidth available on channel 140, then flow continues to processing block 440. At processing block 440, a new single non-multiplexing connection is added to channel 150 for the new call. Flow continues to processing block 450 where the new call is routed over the new non-multiplexing connection established on channel 150. In one embodiment, the new connection is established by presenting calls that overflow the bandwidth of the multiplexing channel 140 to the ATM Q.2931 layer and signaling the call as a non-multiplexed AAL2 connection. Flow continues to processing block 460 where the non-multiplexing connection is torn down once the new call is complete. The process ends at block 499.

In one embodiment, any cells that overflow from channel 140 to channel 150 may return to a multiplexing channel once bandwidth becomes available on the connection.

In another embodiment, the present techniques avoid rejecting calls and allow a user to configure a multiplexed connection with sufficient bandwidth to satisfy an average daily demand. Peak or high volume periods may be satisfied using the overflow technique.

In the forgoing specification, the invention has been described with reference to specific exemplary embodiments thereof. If will, however, be evident that various modifications and changes may be made thereto without deporting from the broader spirit and scope of the invention as set forth in the appended claims. The specification and drawings are, accordingly, to be regarded in an illustrative rather than a restrictive manner.

What is claimed is:

1. In a digital communications network, a method comprising:
    checking a multiplexed connection's bandwidth capacity to carry a call over a link;
    overflowing the call onto a single non-multiplexed connection without sending the call onto the multiplexed connection, when the multiplexing connection's bandwidth is insufficient to carry the call; and
    presenting the call to an ATM Q.2931 layer if the multiplexing connection's bandwidth is insufficient to carry the call, wherein overflowing the call includes adding the single non-multiplexed connection over the link per call with the single non-multiplexed connection having a sufficient bandwidth for only the call; transmitting the call over the non-multiplexed connection; tearing down the single non-multiplexed connection once the call is completed; and transferring the call from the non-multiplexed connection to the multiplexed connection if the multiplexing connection's bandwidth changes from insufficient to sufficient to carry the call.

2. The method of claim 1, further comprising sending the call over the multiplexed connection when the multiplexed connection's bandwidth is sufficient to carry the call.

3. The method of claim 2, wherein the multiplexed connection is a multiplexed Q.AAL2 signaling channel.

4. The method of claim 3, wherein the non-multiplexed connection is a non-multiplexed Q.AAL2 signaling channel.

5. An apparatus for use in a digital communication network, comprising:
    means for checking a multiplexed connection's bandwidth capacity to carry a call over a link;
    means for overflowing the call onto a single non-multiplexed connection without sending the call onto the multiplexed connection, when the multiplexing connection's bandwidth is insufficient to carry the call; and
    means for presenting the call to an ATM Q.2931 layer if the multiplexing connection's bandwidth is insufficient to carry the call, wherein overflowing the call includes means for adding the single non-multiplexed connection over the link per call with the single non-multiplexed connection having a sufficient bandwidth for only the call; means for transmitting the call over the non-multiplexed connection; means for tearing down the single non-multiplexed connection once the call is completed; and means for and transferring the call from the non-multiplexed connection to the multiplexed connection if the multiplexing connection's bandwidth chances from insufficient to sufficient to carry the call.

6. The apparatus of claim 5, further comprising means for sending the call over the multiplexed connection when the multiplexed connection's bandwidth is sufficient to carry the call.

7. The apparatus of claim 5, wherein the multiplexed connection is a multiplexed Q.AAL2 signaling channel.

8. The apparatus of claim 7, wherein the non-multiplexed connection is a non-multiplexed Q.AAL2 signaling channel.

9. A computer-readable storage device having stored thereon a plurality of instructions, said plurality of instructions when executed by a computer, cause said computer to perform the method of:
    checking a multiplexed connection's bandwidth capacity to carry a call over a link;
    overflowing the call onto a single non-multiplexed connection without sending the call onto the multiplexed connection, when the multiplexing connection's bandwidth is insufficient to carry the call; and
    presenting the call to an ATM Q.2931 layer if the multiplexing connection's bandwidth is insufficient to carry the call, wherein overflowing the call includes adding the single non-multiplexed connection over the link per call with the single non-multiplexed connection having a sufficient bandwidth for only the call; transmitting the call over the non-multiplexed connection; tearing down the single non-multiplexed connection once the call is completed; and transferring the call from the non-multiplexed connection to the multiplexed connection if the multiplexin connection's bandwidth changes from insufficient to sufficient to carry the call.

10. The computer-readable storage device medium of claim 9 having stored thereon additional instructions, said plurality of instructions when executed by a computer, cause said computer to further perform the method of sending the call over the multiplexed connection when the multiplexed connection's bandwidth is sufficient to carry the call.

11. The computer-readable storage device of claim 9, wherein the multiplexed connection is a multiplexed Q.AAL2 signaling channel.

12. The computer-readable storage device of claim 11, wherein the non-multiplexing connection is a non-multiplexed Q.AAL2 signaling channel.

13. A digital communication switch comprising:
    a bus;
    a processor coupled to the bus;
    a storage device coupled to the bus, the storage device to store instructions to be executed by the processor;
    a buffer to store voice data cells, wherein the processor is configured to monitor the available bandwidth of a multiplexed connection, receive a voice call, route the voice call according to the available bandwidth, and overflow the voice call onto a single non-multiplexed connection without sending the voice call onto the multiplexed connection when the available bandwidth of the multiplexed connection is insufficient to carry the voice call; and
    presenting the voice call to an ATM Q.2931 layer if the multiplexing connection's bandwidth is insufficient to carry the voice call, wherein overflowing the voice call includes adding the single non-multiplexed connection over the link per call with the single non-multiplexed connection having a sufficient bandwidth for only the call; transmitting the voice call over the non-multiplexed connection; tearing down the single non-multiplexed connection once the voice call is completed; and transferring the call from the non-multiplexed connection to the multiplexed connection if the multiplexing connection's bandwidth chances from insufficient to sufficient to carry the call.

14. The switch of claim 13, wherein the processor is configured to send the voice call over the multiplexed connection when the available bandwidth of the multiplexed connection is sufficient to carry the voice call.

15. The switch of claim 14, wherein the multiplexing connection is a multiplexed Q.AAL2 signaling channel.

16. The switch of claim 15, wherein the non-multiplexing connection is a non-multiplexed Q.AAL2 signaling channel.

* * * * *